US00H002245H

(19) United States
(12) Statutory Invention Registration
Heck et al.

(10) Reg. No.: US H2245 H
(43) Published: Aug. 3, 2010

(54) AGE-HARDENABLE, NICKEL-BASE SUPERALLOY WITH IMPROVED NOTCH DUCTILITY

(75) Inventors: Karl A. Heck, West Lawn, PA (US); Richard B. Frank, Reading, PA (US)

(73) Assignee: CRS Holdings, Inc., Wilmington, DE (US)

(21) Appl. No.: 12/046,871

(22) Filed: Mar. 12, 2008

Related U.S. Application Data

(60) Provisional application No. 60/894,260, filed on Mar. 12, 2007.

(51) Int. Cl.
*B22D 23/00* (2006.01)
*C22F 1/10* (2006.01)
*C22C 19/05* (2006.01)

(52) U.S. Cl. ..... 420/448; 420/447; 164/55.1; 148/556

(58) Field of Classification Search ..... 420/441–442, 420/445–448, 450–454, 459–460
See application file for complete search history.

(56) References Cited

U.S. PATENT DOCUMENTS

| | | | | |
|---|---|---|---|---|
| 4,066,447 | A | | 1/1978 | Smith, Jr. et al. |
| 4,200,459 | A | | 4/1980 | Smith, Jr. et al. |
| 5,059,257 | A | * | 10/1991 | Wanner et al. ..... 148/607 |
| 5,283,032 | A | | 2/1994 | Wanner et al. |
| 6,730,264 | B2 | | 5/2004 | Cao |

OTHER PUBLICATIONS

Pyromet Alloy 718, Technical Data Sheet, Published 1998.

Allvac 718Plus Alloy, Technical Data Sheet, Published 2005.

Carpenter Waspaloy, Technical Data Sheet, Published 1998.

Pyromet Alloy CTX–909, Technical Data Sheet, Published 1989.

* cited by examiner

*Primary Examiner*—Dan Pihulic
(74) *Attorney, Agent, or Firm*—Dann, Dorfman, Herrell and Skillman, P.C.

(57) ABSTRACT

A precipitation hardenable nickel base alloy that provides a novel combination of elevated temperature strength, ductility, and reduced notch sensitivity at temperatures up to about 1300° F. is described. The alloy contains, in weight percent, about

| | |
|---|---|
| Carbon | 0.10 max. |
| Manganese | 0.35 max. |
| Silicon | 0.2-0.7 |
| Phosphorus | 0.03 max. |
| Sulfur | 0.015 max. |
| Chromium | 12-20 |
| Molybdenum | 4 max. |
| Tungsten | 6 max. |
| Cobalt | 5-12 |
| Iron | 14 max. |
| Titanium | 0.4-1.4 |
| Aluminum | 0.6-2.6 |
| Niobium | 3-7 |
| Boron | 0.003-0.015 |

the balance being nickel and usual impurities. An article made from the alloy and a method of making the alloy are also disclosed.

13 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

1000X

5000X

AGE-HARDENABLE, NICKEL-BASE SUPERALLOY WITH IMPROVED NOTCH DUCTILITY

CROSS-REFERENCE

This application claims the benefit of U.S. Provisional Patent Application No. 60/894,260, filed Mar. 12, 2007, the entire contents of which are incorporated herein by reference.

FIELD OF THE INVENTION

This invention relates to nickel-base superalloys and in particular to a nickel-base superalloy in which the elements are balanced to provide a unique combination of strength and improved notch ductility, particularly at elevated temperatures up to about 1300° F.

BACKGROUND OF THE INVENTION

Waspaloy (UNS N07001) is a precipitation hardenable, nickel-base alloy which is used in elevated temperature applications. The alloy has found particular utility in gas turbine engine parts and aircraft jet engines that require considerable strength and good resistance to oxidation and hot corrosion at temperatures up to about 1600° F. (871° C.). Waspaloy provides good resistance to hot corrosion that results from exposure to combustion byproducts encountered in gas turbines and aircraft jet engines. A disadvantage of Waspaloy is that it is a relatively expensive alloy compared to other nickel-base superalloys. The higher cost of Waspaloy is attributable to the high amounts of nickel and cobalt used in the alloy and the difficulty of processing the alloy such as hot working and welding.

Alloy 718 (UNS N07718) is another precipitation hardenable nickel-base superalloy that provides very high yield strength, tensile strength, and creep rupture properties. However, the combination of properties provided by Alloy 718 degrades at very high temperatures. Therefore, the alloy is typically limited to applications that involve temperatures below about 1300° F. (704° C.).

A further precipitation hardenable nickel-base alloy designated UNS N07818 is known. That alloy has a composition that is designed to provide elevated temperature mechanical properties and processing characteristics that are intermediate to those provided by Waspaloy and 718. It has been determined that UNS N07818 can exhibit increased notch sensitivity during stress rupture testing at 1300° F. (704° C.) at higher stress levels of about 90 to 100 ksi. Notch sensitivity has been defined as the extent to which the sensitivity of a material to fracture is increased by the presence of a stress concentration area, such as notch, crack, or a scratch on the material. Higher notch sensitivity is usually associated with brittle materials, whereas lower notch sensitivity is usually associated with ductile materials. *ASM Materials Engineering Dictionary,* p. 294, ASM International 1992.

In view of the foregoing, it appears that there is a need for a precipitation hardenable, nickel-base alloy that provides the elevated temperature mechanical properties of UNS N07818, but with improved notch ductility at stress levels of 90 ksi and above.

SUMMARY OF THE INVENTION

The shortcomings of the alloys described above are overcome by an alloy and method of making an alloy in accordance with the present invention. In accordance with a first aspect of the present invention there is provided an alloy having the following weight percent composition.

| | | |
|---|---|---|
| Carbon | 0-0.10 | |
| Manganese | 0.35 | |
| Silicon | 0.2-0.7 | |
| Phosphorus | 0.03 | max. |
| Sulfur | 0.015 | max. |
| Chromium | 12-20 | |
| Molybdenum | 4 | max. |
| Tungsten | 6 | max. |
| Cobalt | 5-12 | |
| Iron | 14 | max. |
| Titanium | 0.4-1.4 | |
| Aluminum | 0.6-2.6 | |
| Niobium | 3-7 | |
| Boron | 0.003-0.015 | |

The balance of the alloy is nickel and usual impurities. The alloy of this invention provides a novel combination of elevated temperature strength, ductility, and reduced notch sensitivity relative to UNS N07818.

In accordance with another aspect of the present invention, there is provided a method of making a precipitation hardenable nickel base superalloy. The method according to the invention includes the step of providing charge materials in a vacuum melting furnace, the charge materials being selected to provide an alloy having the following weight percent composition.

| | | |
|---|---|---|
| Carbon | up to about 0.10 | |
| Manganese | up to about 0.35 | |
| Phosphorus | 0.03 | max. |
| Sulfur | 0.015 | max. |
| Chromium | 12-20 | |
| Molybdenum | 4 | max. |
| Tungsten | 6 | max. |
| Cobalt | 5-12 | |
| Iron | 14 | max. |
| Titanium | 0.4-1.4 | |
| Aluminum | 0.6-2.6 | |
| Niobium | 4-8 | |
| Boron | 0.003-0.015 | |
| Nickel and Impurities | Balance | |

In a second step, the process includes adding an amount of silicon that is effective to provide precipitation of a globular intermetallic phase in the alloy during elevated temperature processing of the alloy. Preferably, that objective is obtained when a retained amount of about 0.2 to 0.7 weight percent silicon is present in the alloy after melting and casting.

In accordance with a further aspect of this invention there is provided an article of manufacture formed of a precipitation hardenable nickel base alloy. The article has a matrix formed of a nickel base alloy, a strengthening precipitate dispersed in the matrix material, and a globular intermetallic precipitate dispersed at the grain boundaries of the matrix material.

Here and throughout this specification, the term "percent" or the symbol "%" means percent by weight, unless otherwise indicated.

DETAILED DESCRIPTION

Figure 1A:
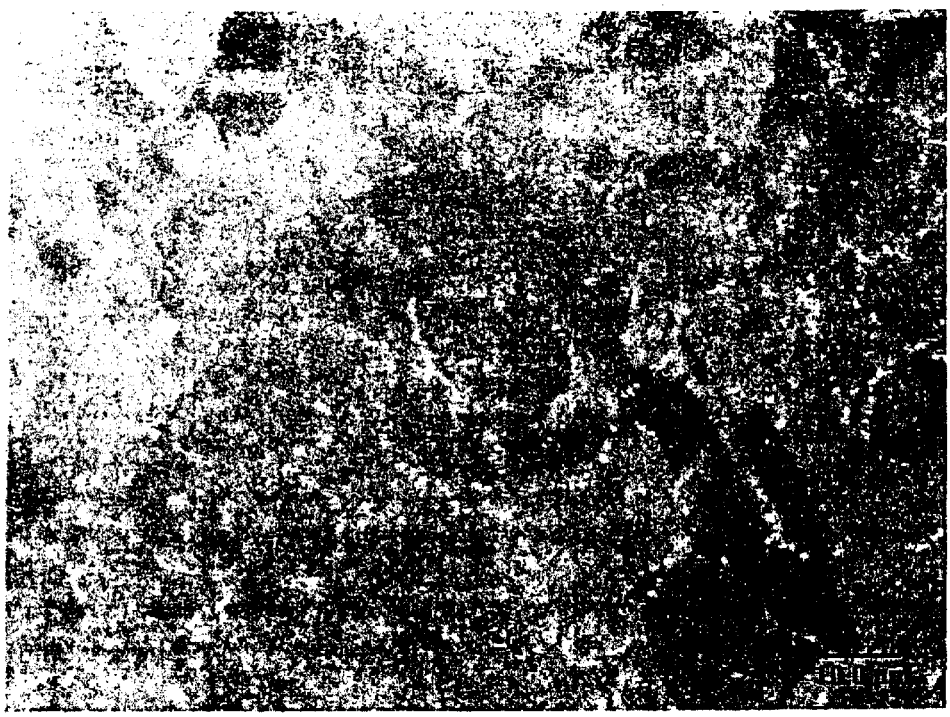
FIGS. 1A and 1B are scanning electron micrographs (SEM) of a sample of Heat 10932 taken at magnifications 1000X and 5000X, respectively.

The present invention stems from the inventors' discovery that a Laves-type secondary phase can be beneficial to improve the notch ductility of a low-cobalt-containing, precipitation-hardenable, nickel base superalloy such as Alloy 718. The Laves phase that is beneficial in the present invention is an intermetallic phase containing one or more of the elements Si, Fe, Ni, Co, and Cr, in combination with one or more of the elements Nb, Mo, W, Al, and Ti. The beneficial Laves phase preferably forms at the grain boundaries of the matrix material. The Laves phase of interest in alloy of this invention is readily distinguishable from the strengthening phases which form during the age hardening heat treatment. Those phases are usually gamma prime (γ') and gamma double-prime (γ"). The Laves phase used in the present invention is believed to have a globular morphology and is also distinguishable from the blocky form of Laves phase that forms during solidification. This secondary phase aids grain refinement during processing of the alloy and appears to contribute to retention of a fine grain structure when the alloy is processed at a solution temperature higher than those typically used for alloys such as Alloy 718.

An alloy made in accordance with the present invention is a nickel base, superalloy that includes up to about 0.10% carbon, up to about 0.35% manganese, not more than about 0.03% phosphorus, not more than about 0.015% sulfur, about 12-20% chromium, not more than about 4% molybdenum, not more than about 6% tungsten, about 5-12% cobalt, not more than about 14% iron, about 0.4-1.4% titanium, about 0.6-2.6% aluminum, about 4-8% niobium, about 0.003-0.015% boron. The alloy also contains a positive addition of silicon effective to provide a retained amount of about 0.2-0.7% silicon. Preferably the alloy contains at least about 0.3% silicon and not more than about 0.6% silicon. For best results, the alloy contains about 0.4-0.5% silicon. The balance of the alloy is nickel and the usual impurities present in commercial grades of nickel base superalloys.

WORKING EXAMPLES

Example I

A globular Laves phase forms in nickel-cobalt-base, low thermal expansion superalloys at silicon levels less than about 0.5%. However, a positive addition of silicon in that range was not previously used in nickel base superalloys such as 718 or UNS N07818. Therefore, it was decided to evaluate the effect of silicon in the range 0 to 1.5%. More specifically, four silicon levels were selected for evaluation, about 0%, about 0.5%, about 1.0%, and about 1.5% silicon. The silicon was added to a base alloy composition for UNS N07818. Niobium is known to stabilize the globular Laves phase in the low thermal expansion superalloys. Accordingly, it was decided to test experimental alloy compositions containing each of those four silicon levels in combination with about 6.0% niobium and also with about 5.4% niobium. The latter niobium amount is closer to the nominal niobium content of 718 and UNS N07818.

Eight 22-lb heats were vacuum-induction melted and cast as 2.75" square, tapered ingots. The weight percent chemistries of those heats are shown Table I (Series I heats). The ingots were homogenized and then heated to 2050° F. for forging. The ingots were forged to 1⅜" square, reheated to 2050° F., and then finish forged to ¾"×1¼" bar. One bar from heat 1101 broke during forging because it was bent and it was forged at too low a temperature. Otherwise, there were no hot working problems that could be attributed to the modified compositions. The alloy according to this invention forges similarly to Alloy 718 with respect to start and finish temperatures and the applied forging force.

The solution heat treating range for the experimental alloys was initially selected to be about 1750° F. to about 1850° F., but it was found that notch sensitivity increased when the alloys were solution treated in the upper part of the temperature range, i.e., from about 1800° F. to about 1850° F. Solution treatments at 1800° F. and 1850° F. for 1 hour, followed by cooling in air, were used for the evaluations. The solution treated ingots were given a double aging treatment consisting of heating at 1450° F. for 8 hours, furnace cooling at a rate of 100° F. per hour to 1300° F., holding at 1300° F. for 8 hours, and then cooling in air.

Longitudinal mechanical test blanks were cut from a mid-radius section of the ¾"×1¼" bars, two per section. The test blanks were heat treated as described above, one set with the 1800° F. solution treatment and a second set with the 1850° F. solution treatment. The heat treated blanks were then low-stress-ground. Tensile specimens having a 0.250" gage diameter and stress-rupture specimens having a 0.178" diameter were machined from the blanks. Tensile specimens representing both solution heat treatments were tested at room temperature and at 1300° F. The combination smooth-notched stress-rupture specimens were tested at 1300° F. at a stress level of 90 ksi. Because an 1850° F. treatment is known to increase notch sensitivity in other alloys, smooth section specimens were also tested to evaluate rupture ductility. It is not possible to measure ductility with a notched specimen. Stress-rupture properties were evaluated in this work because it is believed that there is a correlation between notch ductility and dwell crack growth resistance.

The results of the tensile and stress rupture testing for the eight Series I heats are shown in Table II. Microstructural observations of the test specimens are set forth in Table III. The microstructural observations make it clear that a globular Laves-type phase did precipitate in heats containing at least 0.5% silicon. The stress-rupture results for the Series I heats also indicate that heats with 0.5% Si or less, for example, Heat 1098, could provide improved notch ductility relative to UNS N07818.

Example II

Based on the results provided by the Series I heats, a second series of five heats was melted. One set contained about 0% silicon, another set contained about 0.15% silicon, a third set contained about 0.30% silicon, and the fourth set contained about 0.45% silicon. The weight percent compositions of the Series II heats are also shown in Table I. Because the first series of heats exhibited some segregation and non-uniform grain structures, certain processing changes were made. More specifically, the ingot size was increased from 2.75" to 3.5" so that the amount of reduction the ingots would undergo during processing would increase. In the second step of the homogenization treatment, the temperature was increased to reduce microsegregation in the alloy. The forging starting temperature was increased from 2050° F. to 2100° F. to avoid development of coarse unrecrystallized grains during forging of small section sizes. The finish width of the as-forged ingots was increased from 1.25" to 1.375" to shift the forging X-pattern away from the mid-radius region used to obtain material for test samples. Tensile and stress rupture samples were prepared and tested in the same manner as the Series I specimens, except as noted above. Test results for the five Series II heats are shown in Table IV. Microstructural observations for the Series II specimens are set forth in Table V.

It was found that the globular, Laves-type, secondary phase precipitated in the test alloys having a composition that includes at least about 0.3% silicon. More extensive amounts were observed in heats containing 0.42% silicon and above. The secondary phase restricted grain growth in the 1850° F. solution treated heats such that heats with 0.4% or more silicon had a very fine grain structure (ASTM 10 or finer). In contrast, UNS N07718 and UNS N07818 typically have medium grain sizes of ASTM 5-7 when solution treated at 1850° F. Clean microstructures with medium-to-coarse grain size are inherently susceptible to notch failures because of the rapid growth of grain boundary cracks.

Regardless of solution or test temperature, test heats containing the higher amounts of silicon (≧0.3%) provided increased yield strength and reduced tensile ductility compared to heats containing the lower amounts of silicon (<0.3%). The largest effects occurred in the heats containing positive amounts up to 0.5% Si where the globular Laves-type phase was observed to significantly reduce grain size. Further improvements in tensile properties with silicon above 0.5% were minor because all heats had ultra-fine grain size and very extensive fine precipitation of the globular Laves-type phase. The test results also show the effect of higher niobium content, i.e., 6% compared to 5.4%. The heats containing the higher amounts of niobium also provided higher strength, but somewhat reduced ductility. However, the effect was less pronounced than observed when only the amount of silicon is considered.

An important objective of the testing was to identify compositions with improved resistance to notch failures in stress-rupture tests. As can be seen from Tables II and IV of the Series I heats (0-1.6% Si), the heat with 0.5% Si and 5.4% Nb were free of notch failures. A similar result was observed during testing of Series II heats (0-0.45% Si) in that the heat with 0.42% Si and 5.4% Nb did not have notch failures. In general, increasing the amount of silicon generally resulted in reduced stress-rupture life. Effects on stress-rupture ductility were inconsistent. However, most specimens that fractured in the smooth section had high values for elongation and reduction of area. Although increasing the silicon content reduced stress-rupture life, the rupture lives for the heats containing 0.4-0.5% silicon are still comparable to those expected for Waspaloy under the same test conditions (1300° F. and 90 ksi).

Example III

Two 400-lb heats, one representing UNS N07818 (Heat 10931) and the other representing the alloy according to the present invention (Heat 10932), were VIM/VAR melted and cast as 8" round ingots. Table VI shows the chemical analyses of the two heats. The ingots were homogenized and heated to about 2050° F. for forging. The ingots were forged to 6" octagon billets in one heating. The 6" octagonal billets were surface ground and then rotary forged to 2.8" round bar from a starting temperature of about 1950° F. The billets were forged using five reductions of 20-22%. The applied forging forces were similar to those used for Alloy 718. The billet ends were cropped and samples from the croppings were macro-etch inspected. The inspection revealed no undesirable conditions.

Longitudinal mechanical test blanks were cut from the mid-radius location of the bars, six pieces per section. Based on previous results, solution treatments of 1800° F. to 1850° F. for 1 hour, followed by air cooling, were used to solution treat the test samples for evaluation of mechanical properties. The solution treatments were followed by a double-aging treatment of 1450° F. for 8 hours, furnace cooling at 100° F. per hour to 1300° F., holding at 1300° F. for 8 hours and then cooling in air. A first set of test blanks were cut before heat treatment. Some full sections were heat treated and then test blanks were cut after heat treatment to obtain samples that simulate the slower heating rate of larger section sizes.

Low-stress-ground 0.250" gage diameter smooth tensile and 0.178" diameter combination smooth-notched stress-rupture specimens were prepared from the test blanks. The tensile specimens representing the various solution temperatures were tested at room temperature and at 1300° F. The stress rupture specimens were tested at 1300° F./90 ksi. A few specimens were also tested at a higher stress level, 1300° F./100 ksi. Mechanical property results for the two heats are set forth in Table VII.

In order to determine the effects of long-term exposure at high service temperatures, fully-treated bar samples were exposed in air at 1300° F. for periods of up to 1,000, up to 3,000 hours, and up to 10,000 hours. Tensile and stress-rupture specimens were cut, machined, and tested as described above. Charpy V-notch (CVN) impact specimens were also prepared and tested. Table VIII shows the results of mechanical testing for the long-term exposed samples.

The globular second phase in heat-treated samples of the Heat 10932 was analyzed using SEM/EDS, EMPA (microprobe), and X-ray diffraction techniques. The phase was too fine to accurately analyze in situ. However, it was possible to confirm that the phase particles are enriched in Si, Nb, and Mo and depleted in Ni and Al relative to the matrix material. The phase material was isolated using carbon replicas and acid extraction. The X-ray diffraction analysis showed that there were matches with up to four Laves-type phases, two with hexagonal crystal structures and two with cubic structures. The basic formulas for the most likely matches are $Co_3SiNb_2$, $Co_2Nb$, and $(Cr,Si,Fe)_2(Ti,Mo)$. The SEM/EDS analysis yielded the following quantitative analysis of the globular phase.

| Element | Wt. % | At. % |
|---|---|---|
| Cr | 9.13 | 12.05 |
| Fe | 4.27 | 5.25 |
| Co | 8.22 | 9.57 |
| Ni | 20.03 | 23.42 |
| Si | 3.72 | 9.09 |
| Ti | 0.38 | 0.55 |

-continued

| Element | Wt. % | At. % |
|---|---|---|
| Al | 0.26 | 0.65 |
| Mo | 19.62 | 14.04 |
| Nb | 34.36 | 25.38 |

Figure 1B:
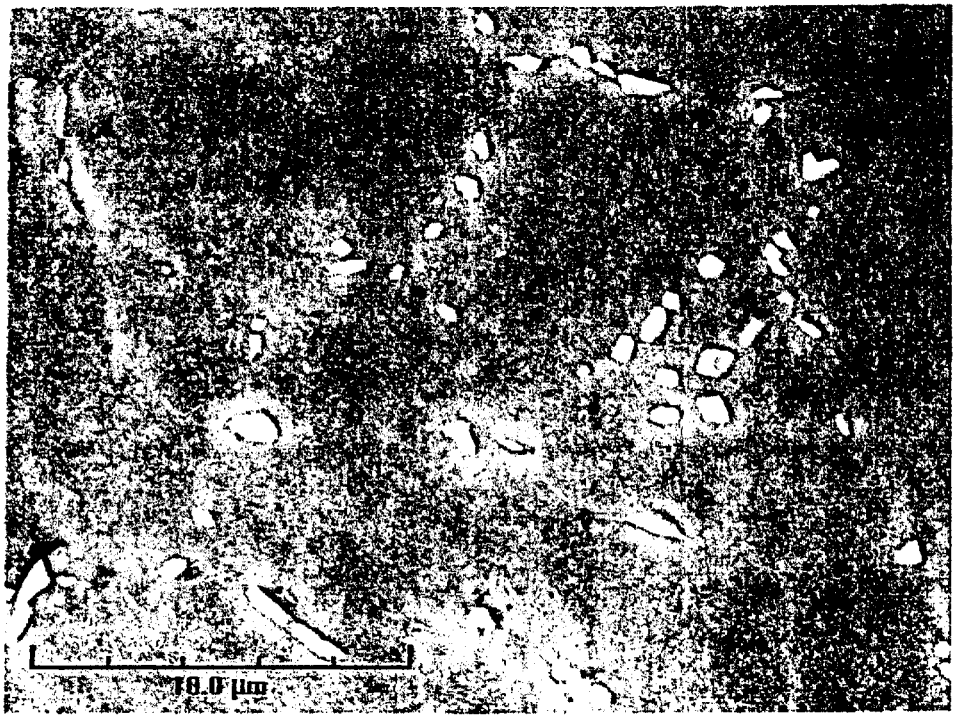

FIGS. 1A and 1B show SEM micrographs of the grain boundary precipitates in a fully-treated sample of the Heat 10932. Samples of each heat were also analyzed (SEM/EDS) after 3,000-hour exposure at 1300° F. There were no additional phases found in Heat 10932 beyond the globular Laves-type phase. Heat 10931 contained small amounts of a phase with three possible matches, Fe-Mo (R-phase), Fe-Ti (Laves) and Ni-Mo.

Figure 2:
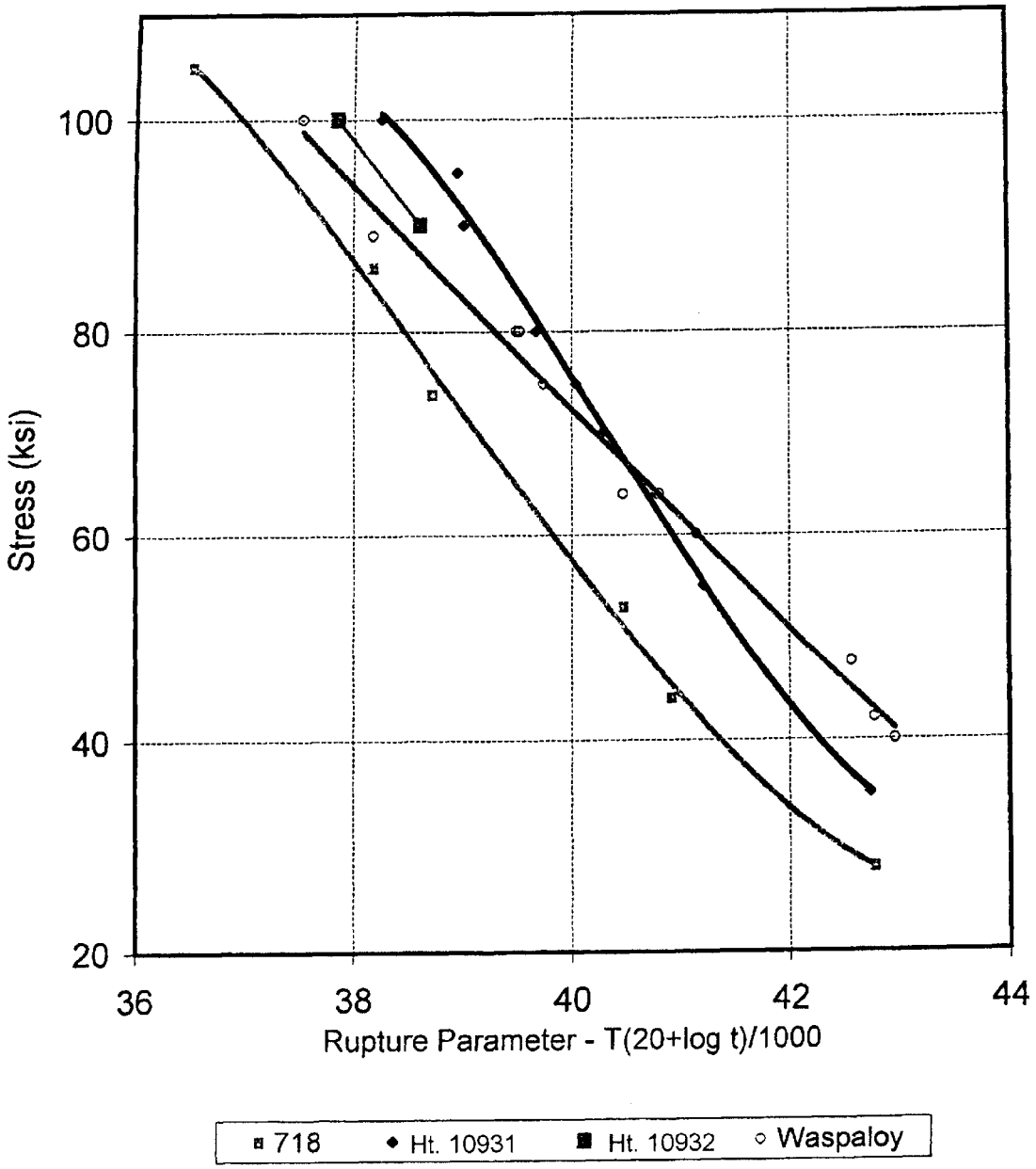
FIG. 2 shows Larson-Miller graphs of stress rupture strength for Heat 10931, Heat 10932, Alloy 718, and WASPALOY.

The stress-rupture results listed in Table VII clearly confirm that the alloy Heat 10932 provides improved notch ductility for material solution treated at 1800-1850° F. prior to aging. For the known alloy, represented by Heat 10931 solution treated above 1800° F., 12 of 13 specimens had short-time notch failures at 1300° F./90-100 ksi. Thus, the alloy according to the present invention permits an extended solution treating range up to at least 1830° F. Heat 10932 did provide somewhat reduced stress-rupture life relative to Heat 10931. However, it is believed that the precipitation of fine Laves phase on the grain boundaries and finer grain size are responsible for the better notch ductility provided by Heat 10932. FIG. 2 shows Larson-Miller curves for the stress-rupture life performance of Heats 10931 and 10932 and for Alloy 718 and Waspaloy. The graphs shown in FIG. 2 indicate that the alloy according to this invention (Heat 10932) provides stress rupture life that is similar to or greater than that provided by the Waspaloy alloy.

Figure 3A:
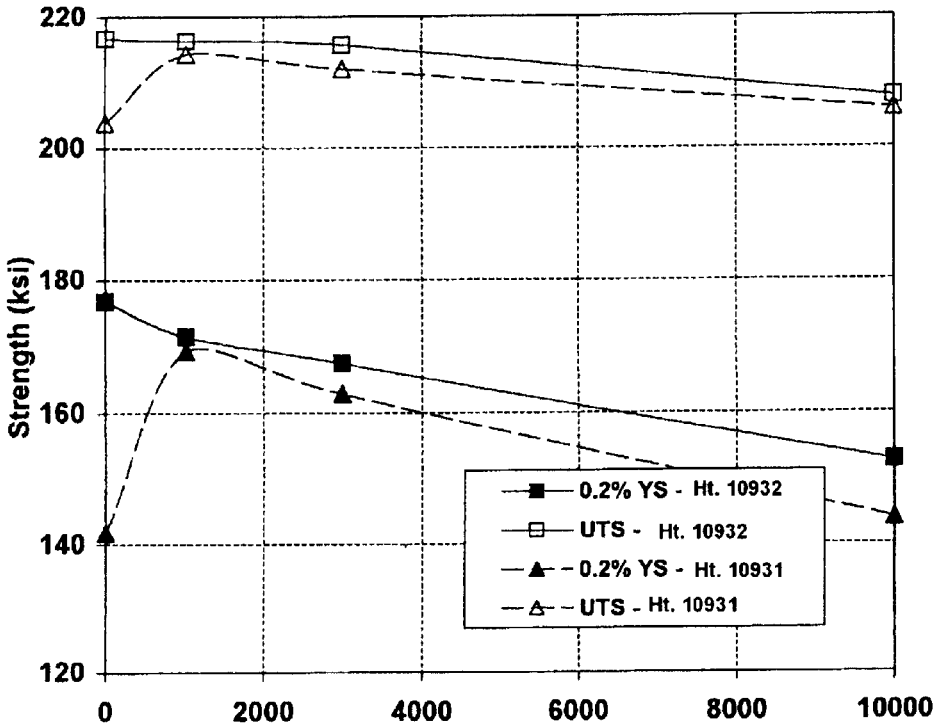
FIG. 3A shows graphs of room temperature tensile and yield strength properties of Heats 10931 and 10932 after exposure for up to 10,000 hours at 1300° F.
Figure 3B:
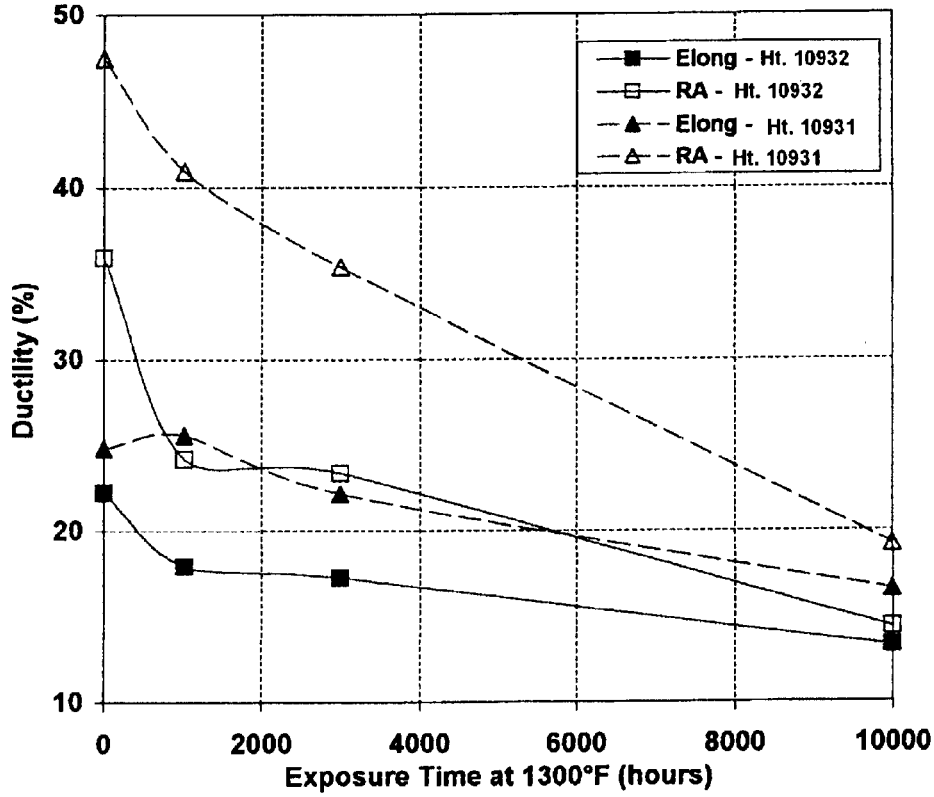
FIG. 3B shows graphs of room temperature tensile ductility properties of Heats 10931 and 10932 after exposure for up to 10,000 hours at 1300° F.

Samples from both heats fractured in the notch region when solution treated at the higher temperature of 1850° F. prior to aging. Therefore, it appears that a temperature of 1850° F. represents the upper limit for a viable solution heat treatment for the tested alloys. The results presented in Table VII show that Heat 10932 provides significantly higher tensile strength than Heat 10931 although at somewhat reduced ductility. In the heat-treated condition, the material from Heat 10932 had finer grain size and more strain than the material from Heat 10931 (see Table VIII) which resulted in the strength improvement. FIGS. 3A and 3B show that the room-temperature tensile properties of both heats were relatively stable during 1300° F. exposure for up to 10,000 hours. Ductility was reduced somewhat, but neither alloy was embrittled. This result was particularly unexpected for Heat 10932, the higher Si-containing heat, because silicon is known to promote the formation of deleterious phases in other alloys after long-term exposure to elevated temperatures.

Figure 4A:
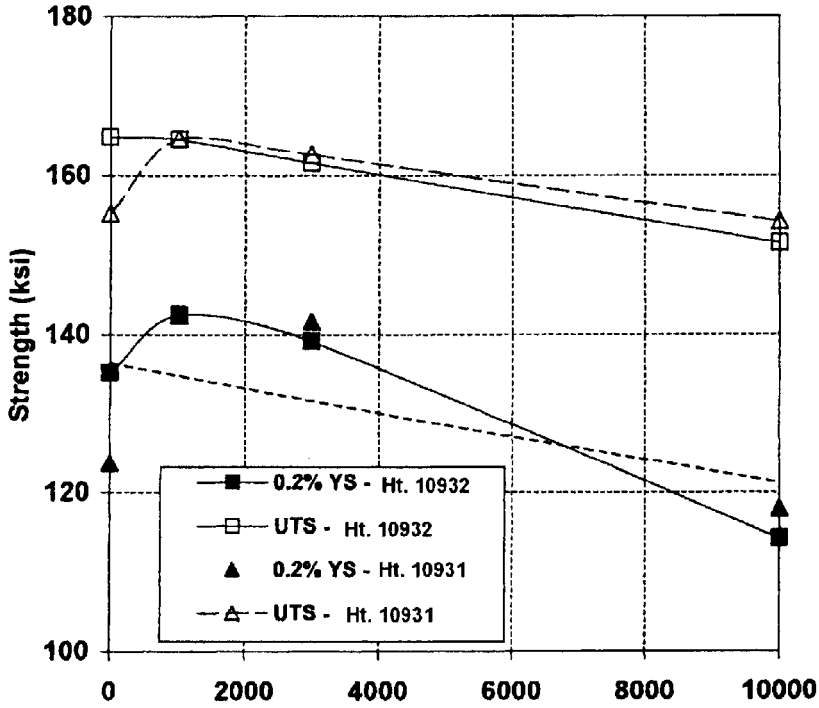
FIG. 4A shows graphs of 1300° F. tensile and yield strength properties of Heats 10931 and 10932 after exposure for up to 10,000 hours at 1300° F.
Figure 4B:
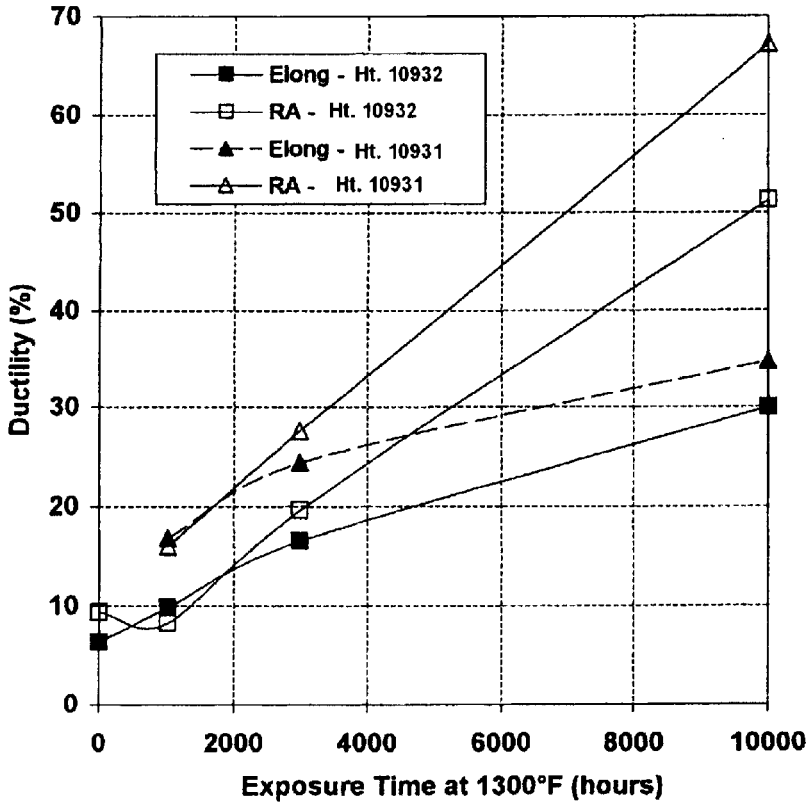
FIG. 4B shows graphs of 1300° F. tensile ductility properties of Heats 10931 and 10932 after exposure for up to 10,000 hours at 1300° F.
Figure 5A:
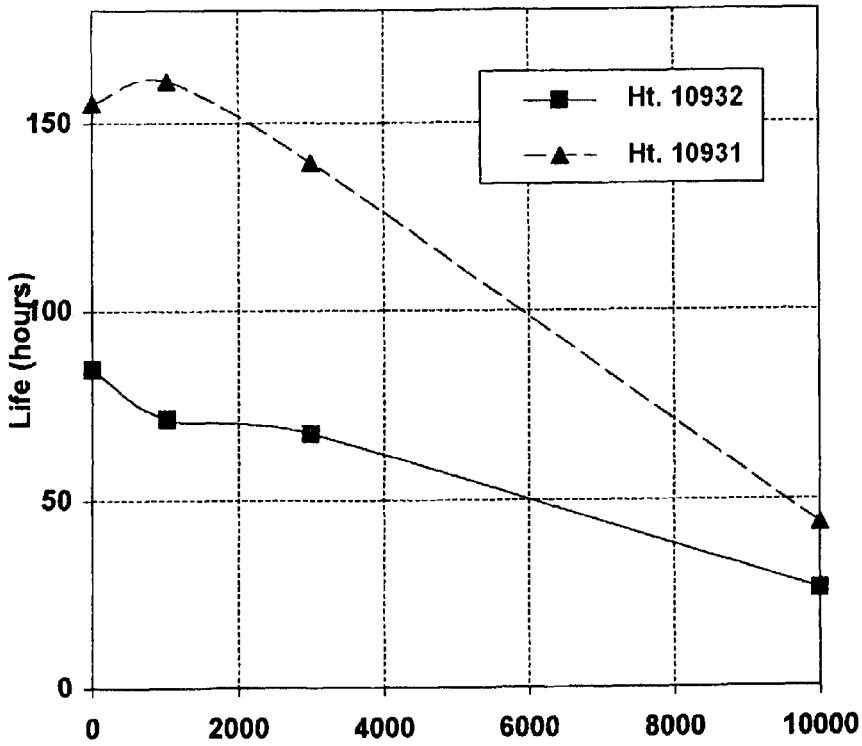
FIG. 5A shows graphs for 1300° F. stress-rupture life of Heats 10931 and 10932 after exposure for up to 10,000 hours at 1300° F.
Figure 5B:
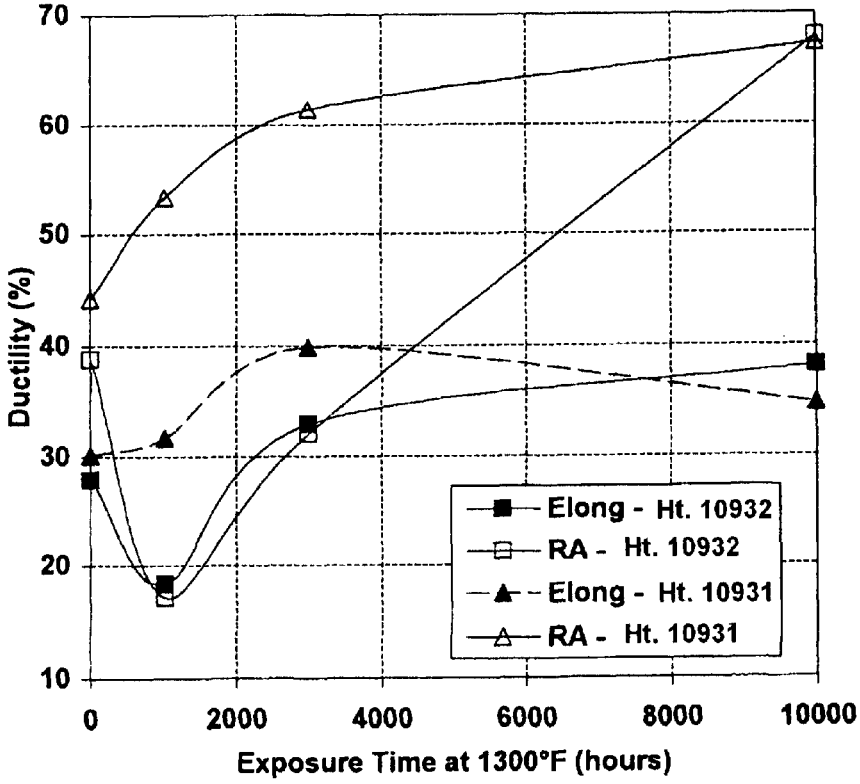
FIG. 5B shows graphs for 1300° F. stress-rupture ductility of Heats 10931 and 10932 after exposure for up to 10,000 hours at 1300° F.

FIGS. 4A and 4B show that the 1300° F. tensile properties actually increased during long-term exposure. FIGS. 5A and 5B show that the stress-rupture life and ductility of the tested heats were stable alter the long-term exposure and that the notch ductility was not adversely affected. Both heats had reduced impact toughness alter long-term exposure (3,000 hours). Heat 10932 provided somewhat lower toughness, i.e., below about 10 ft-lbs, after the 1,000 hour and the 3,000 hour exposures. The fine globular phases did not embrittle these compositions for exposure times up to 3,000 hours. Rupture ductility increased with longer exposure and notch ductility was retained. Both compositions provided similar ductility after 10,000 hours at 1300° F.

It will be recognized by those skilled in the art that changes or modifications may be made to the above-described embodiments without departing from the broad inventive concepts of the invention. It is understood, therefore, that the invention is not limited to the particular embodiments that are described, but is intended to cover all modifications and changes within the scope and spirit of the invention as described above and set forth in the appended claims.

TABLE I

| Chemical Compositions (Wt %) | | | | | | | | | | | | | | | | | |
|---|---|---|---|---|---|---|---|---|---|---|---|---|---|---|---|---|---|
| Heat | C | Mn | Si | P | S | Cr | Ni | Mo | W | Co | Al | Ti | Nb | B | Ca | Mg | Fe |
| Series I Heats (0 to 1.5% Si) | | | | | | | | | | | | | | | | | |
| 1096 | 0.021 | 0.05 | <0.01 | 0.006 | <0.0005 | 17.91 | 51.79 | 2.71 | 1.05 | 9.14 | 1.44 | 0.74 | 5.37 | 0.0048 | 0.001 | 0.002 | 9.79 |
| 1097 | 0.020 | 0.05 | <0.01 | <0.005 | <0.0005 | 17.92 | 51.79 | 2.69 | 1.05 | 9.16 | 1.43 | 0.75 | 5.97 | 0.0050 | 0.001 | 0.002 | 9.20 |
| 1098 | 0.021 | 0.05 | 0.51 | <0.005 | <0.0005 | 17.89 | 51.80 | 2.72 | 1.05 | 9.15 | 1.41 | 0.75 | 5.39 | 0.0049 | 0.001 | 0.002 | 9.28 |
| 1099 | 0.026 | 0.05 | 0.52 | <0.005 | <0.0005 | 17.92 | 51.84 | 2.70 | 1.05 | 9.14 | 1.42 | 0.74 | 5.94 | 0.0053 | 0.001 | 0.002 | 8.67 |
| 1100 | 0.022 | 0.05 | 0.92 | <0.005 | <0.0005 | 17.96 | 51.82 | 2.71 | 1.06 | 9.14 | 1.43 | 0.75 | 5.37 | 0.0054 | 0.001 | 0.002 | 8.79 |
| 1101 | 0.030 | 0.05 | 1.03 | <0.005 | <0.0005 | 17.95 | 51.81 | 2.70 | 1.04 | 9.13 | 1.39 | 0.74 | 5.97 | 0.0057 | 0.001 | 0.002 | 8.18 |
| 1102 | 0.032 | 0.05 | 1.62 | <0.005 | <0.0005 | 17.93 | 51.72 | 2.71 | 1.04 | 9.13 | 1.41 | 0.74 | 5.40 | 0.0059 | 0.001 | 0.003 | 8.24 |
| 1103 | 0.032 | 0.05 | 1.57 | <0.005 | <0.0005 | 17.94 | 51.77 | 2.71 | 1.03 | 9.13 | 1.39 | 0.74 | 5.98 | 0.0055 | 0.001 | 0.002 | 7.68 |
| Series II Heats (0 to 0.4% Si) | | | | | | | | | | | | | | | | | |
| 1227 | 0.024 | 0.05 | <0.01 | <0.005 | <0.0005 | 17.90 | 51.84 | 2.70 | 1.01 | 9.08 | 1.45 | 0.74 | 5.40 | 0.0027 | <0.001 | 0.003 | 9.82 |
| 1228 | 0.028 | 0.05 | 0.15 | <0.005 | <0.0005 | 17.94 | 51.75 | 2.70 | 1.02 | 9.10 | 1.44 | 0.74 | 5.42 | 0.0026 | <0.001 | 0.002 | 9.69 |
| 1229 | 0.032 | 0.05 | 0.29 | <0.005 | <0.0005 | 17.93 | 51.80 | 2.70 | 1.02 | 9.09 | 1.46 | 0.74 | 5.40 | 0.0022 | 0.001 | 0.003 | 9.52 |
| 1230 | 0.028 | 0.05 | 0.29 | <0.005 | <0.0005 | 17.93 | 51.77 | 2.70 | 1.01 | 9.08 | 1.47 | 0.75 | 6.01 | 0.0037 | 0.001 | 0.003 | 8.94 |
| 1231 | 0.030 | 0.05 | 0.42 | <0.005 | <0.0005 | 17.98 | 51.72 | 2.70 | 1.02 | 9.09 | 1.46 | 0.74 | 5.43 | 0.0037 | 0.001 | 0.002 | 9.38 |

TABLE II

Mechanical Properties - Series I Heats

| | | | | Room-Temperature Tensile | | | | 1300° F. Tensile | | | | Stress Rupture at 1300° F./90 ksi | | | |
|---|---|---|---|---|---|---|---|---|---|---|---|---|---|---|---|
| Heat | Si | Cb | Solution Temp | 0.2% YS (ksi) | UTS (ksi) | Elong (%-4D) | RA (%) | 0.2% YS (ksi) | UTS (ksi) | Elong (%-4D) | RA (%) | Time (hrs) | Elong (%-4D) | RA (%) | Sample Type |
| 1096 | <0.01 | 5.37 | 1800° F. | 144 | 208 | 19 | 27 | 125 | 163 | 12 | 17 | 135 | 47.3 | 64.0 | Combo |
| | | | 1800° F. | 150 | 216 | 25 | 35 | 126 | 162 | 12 | 17 | 0.0 | Notch Break | | Combo |
| | | | 1850° F. | 134 | 202 | 26 | 45 | 115 | 158 | 11 | 18 | 128.2 | 34.0 | 55.6 | Smooth |
| | | | 1850° F. | | | | | | | | | 0.3 | Notch Break | | Combo |
| 1097 | <0.01 | 5.97 | 1800° F. | 165 | 201 | 5 | 12 | 139 | 166 | 20 | 15 | 0.2 | Notch Break | | Combo |
| | | | 1800° F. | 169 | 223 | 20 | 25 | 127 | 165 | 23 | 15 | 23.0 | 30.7 | 71.1 | Combo |
| | | | 1850° F. | 149 | 214 | 27 | 11 | 118 | 150 | 4** | 13.4** | 163.0 | 35.0 | 49.6 | Smooth |
| | | | 1850° F. | | | | | | | | | 0.1 | Notch Break | | Combo |
| 1098 | 0.51 | 5.39 | 1800° F. | 171 | 222 | 15 | 20 | 143 | 167 | 11 | 17 | 34.8 | 14.7 | 20.9 | Combo |
| | | | 1800° F. | 165 | 213 | 9 | 14 | 133 | 163 | 5.9* | 9.9* | 29.2 | 18.9 | 21.9 | Combo |
| | | | 1850° F. | 170 | 223 | 26 | 21 | 143 | 159 | 3.9** | 5.5** | 34.5 | 34.0 | 70.0 | Smooth |
| | | | 1850° F. | | | | | | | | | 18.6 | 13.2 | 17.5 | Combo |
| 1099 | 0.52 | 5.94 | 1800° F. | 196 | 230 | 4.7* | 9.3* | 149 | 169 | 11 | 14 | 23.7 | 33.8 | 67.2 | Combo |
| | | | 1800° F. | 187 | 233 | 9 | 9 | 146 | 171 | 8 | 14 | 0.0 | Notch Break | | Combo |
| | | | 1850° F. | 194 | 232 | 6 | 11 | 146 | 168 | 8 | 11 | 21.5 | >10.5* | 32.2 | Smooth |
| | | | 1850° F. | | | | | | | | | 14.6 | 21.7 | 26.3 | Combo |
| 1100 | 0.92 | 5.37 | 1800° F. | 182 | 229 | 11 | 15 | 149 | 162 | 8.4 | 13.8 | 11.9 | 46.0 | 66.5 | Combo |
| | | | 1800° F. | 180 | 216 | 6 | 11 | 148 | 162 | 12.1 | 14.6 | 0.1 | Notch Break | | Combo |
| | | | 1850° F. | 176 | 212 | 6 | 12 | 144 | 165 | 10.7 | 11.3 | 11.0 | >9.0* | >9.0* | Smooth |
| | | | 1850° F. | | | | | | | | | 0.5 | Notch Break | | Combo |
| 1101 | 1.03 | 5.97 | 1800° F. | 188 | 215 | 5 | 7 | 151 | 168 | 5.1 | 8.5 | 0.1 | Notch Break | | Combo |
| | | | 1800° F. | 193 | 226 | 10 | 14 | 149 | 166 | 7.4 | 11.2 | 15.8 | 42.6 | 66.1 | Combo |
| | | | 1850° F. | 184 | 223 | 8 | 14 | 151 | 171 | 7.6 | 10.7 | 5.9 | 5.8 | 9.1 | Smooth |
| | | | 1850° F. | | | | | | | | | 0.0 | Notch Break | | Combo |
| 1102 | 1.62 | 5.40 | 1800° F. | 180 | 219 | 6 | 8 | 141 | 152 | 21 | 24 | 4.5 | 24.2 | 48.1 | Combo |
| | | | 1800° F. | 174 | 220 | 9 | 12 | 136 | 152 | 22 | 26 | 2.9 | 36.2 | 59.4 | Combo |
| | | | 1850° F. | 175 | 198 | 4 | 5 | 139 | 159 | 9 | 10 | 5.0 | 11.1 | 8.8 | Smooth |
| | | | 1850° F. | | | | | | | | | 6.1 | 50.8 | 64.6 | Combo |
| V001103 | 1.57 | 5.98 | 1800° F. | 182 | 218 | 6 | 10 | 134 | 160 | 10.9 | 12.2 | 12.1 | 39.9 | 62.7 | Combo |
| | | | 1800° F. | 188 | 209 | 1.3* | 3.5* | 140 | 158 | 7.2 | 9.9 | 6.2 | 45.5 | 61.6 | Combo |
| | | | 1850° F. | 169 | 213 | 6.1* | 10.6* | 138 | 163 | 5.6 | 7.6 | 8.7 | >16.2* | 54.3 | Smooth |
| | | | 1850° F. | | | | | | | | | 0.0 | Notch Break | | Combo |

* = broke in outer portion of gage section; ductility may not be representative
** = broke outside gage section; ductility values are invalid
Heat Treatment: 1800° F. or 1850° F./1 h/AC + 1450° F./8 h/FC to 1300° F./8 h/AC
Specimens: Tensile - 0.250" gage diameter threaded, low-stress ground
Stress Rupture - 0.178" diameter combination smooth and notched (Kt = 3.9), low-stress ground

TABLE III

Microstructural Observations for Series I Heats

| | | | Solution | Microstructural Observations | |
|---|---|---|---|---|---|
| Heat | Si | Cb | Temp | Grain Structure | Precipitation |
| 1096 | <0.01 | 5.37 | 1800° F. | Very fine, some recrystallized patches | Extensive fine delta except in patches |
| | | | 1850° F. | Recrystallized ASTM 6-7 | Little or none |
| 1097 | <0.01 | 5.97 | 1800° F. | Recrystallized ASTM 3-5 with fine necklace | Extensive fine delta except in patches |
| | | | 1850° F. | Recrystallized ASTM 5-7 | Small amount of grain boundary ppt |
| 1098 | 0.51 | 5.39 | 1800° F. | Very fine mixed with ASTM 7-8 patches | Globular ppt throughout |
| | | | 1850° F. | Mixed very fine and ASTM 5-7 | Globular ppt throughout, less than 1800° F. |
| 1099 | 0.52 | 5.94 | 1800° F. | Very fine, some ASTM 7-8 urg patches | Globular ppt throughout |
| | | | 1850° F. | Mixed | Globular ppt throughout |

TABLE III-continued

Microstructural Observations for Series I Heats

| | | | Solution | Microstructural Observations | |
|---|---|---|---|---|---|
| Heat | Si | Cb | Temp | Grain Structure | Precipitation |
| 1100 | 0.92 | 5.37 | 1800° F. | Uniform very fine | Extensive ppt of various sizes |
| | | | 1850° F. | Uniform very fine | Extensive ppt of various sizes |
| 1101 | 1.03 | 5.97 | 1800° F. | Uniform very fine | Very extensive ppt of various sizes |
| | | | 1850° F. | Uniform very fine | Very extensive ppt of various sizes |
| 1102 | 1.62 | 5.40 | 1800° F. | Uniform very fine | Very extensive ppt of various sizes |
| | | | 1850° F. | Uniform very fine | Very extensive ppt of various sizes |
| 1103 | 1.57 | 5.98 | 1800° F. | Uniform very fine | Very extensive ppt of various sizes |
| | | | 1850° F. | Uniform very fine | Very extensive ppt of various sizes |

Heat Treatment: 1800° F. or 1850° F./1 h/AC + 1450° F./8 h/FC to 1300° F./8 h/AC

TABLE IV

Mechanical Properties of Series II Heats

| | | | | Room-Temperature Tensile | | | | 1300° F. Tensile | | | | Stress Rupture at 1300° F./90 ksi | | | |
|---|---|---|---|---|---|---|---|---|---|---|---|---|---|---|---|
| Heat | Si | Cb | Solution Temp | 0.2% YS (ksi) | UTS (ksi) | Elong (%-4D) | RA (%) | 0.2% YS (ksi) | UTS (ksi) | Elong (%-4D) | RA (%) | Time (hrs) | Elong (%-4D) | RA (%) | Sample Type |
| 1227 | <0.01 | 5.40 | 1800° F. | 172 | 222 | 18 | 27 | 138 | 166 | 22 | 44 | 46.5 | 29.9 | 69.9 | Combo |
| | | | 1800° F. | 159 | 216 | 25 | 45 | 135 | 165 | 14 | 15 | 49.4 | 26.4* | 72.0 | Combo |
| | | | 1850° F. | 140 | 207 | 28 | 50 | 116 | 157 | 10 | 12 | 0.1 | Notch Break | | Combo |
| | | | 1850° F. | 140 | 207 | 27 | 51 | 117 | 157 | ** | ** | 128.5 | 48.3 | 26.4 | Combo |
| 1228 | 0.15 | 5.42 | 1800° F. | 161 | 219 | 24 | 46 | 139 | 166 | 16 | 20 | 26.7 | 36.1 | 69.8 | Combo |
| | | | 1800° F. | 160 | 218 | 23 | 45 | 136 | 166 | 20 | 29 | 21.7 | 35.8 | 70.1 | Combo |
| | | | 1850° F. | 137 | 208 | 28 | 48 | 114 | 159 | 11 | 14 | 0.2 | Notch Break | | Combo |
| | | | 1850° F. | 139 | 207 | 28 | 48 | 120 | 160 | 10 | 17 | 0.2 | Notch Break | | Combo |
| 1229 | 0.29 | 5.40 | 1800° F. | 171 | 224 | 19 | 29 | 142 | 166 | 14 | 17 | 32.5 | 51.7 | 65.8 | Combo |
| | | | 1800° F. | 169 | 222 | 21 | 40 | 138 | 164 | 10 | 12 | 33.2 | 37.9* | 50.7* | Combo |
| | | | 1850° F. | 152 | 214 | 23* | 45* | 130 | 165 | 10 | 15 | 65.5 | 21.9 | 36.2 | Combo |
| | | | 1850° F. | 149 | 212 | 26 | 48 | 122 | 159 | 11 | 12 | 0.2 | Notch Break | | Combo |
| 1230 | 0.29 | 6.01 | 1800° F. | 177 | 228 | 17 | 28 | 143 | 168 | 16 | 26 | 49.2 | 37.4 | 60.2 | Combo |
| | | | 1800° F. | 174 | 227 | 15 | 22 | 141 | 168 | 20 | 25 | 30.2 | 39.9 | 71.3 | Combo |
| | | | 1850° F. | 170 | 226 | 22 | 38 | 145 | 172 | 9 | 11 | 36.2 | 11.0* | 19.4* | Combo |
| | | | 1850° F. | 176 | 229 | 21 | 38 | 147 | 173 | 8 | 12 | 39.0 | 32.0 | 65.9 | Combo |
| 1231 | 0.42 | 5.43 | 1800° F. | 169 | 223 | 18 | 34 | 141 | 166 | 11.3 | 15.0 | 49.5 | 40.9 | 58.2 | Combo |
| | | | 1800° F. | 172 | 225 | 20 | 36 | 147 | 168 | 11.4 | 15.2 | 28.5 | 17.8 | 23.1 | Combo |
| | | | 1850° F. | 166 | 222 | 20 | 36 | 140 | 167 | 10 | 14 | 43.6 | 39.9 | 69.6 | Combo |
| | | | 1850° F. | 160 | 217 | 21 | 39 | 142 | 165 | 12.5 | 12.7 | 72.8 | 13.8* | 46.2* | Combo |

* = broke in outer portion of gage section; ductility may not be representative

** = broke outside gage section; ductility values are invalid

Heat Treatment: 1800° F. or 1850° F./1 h/AC + 1450° F./8 h/FC to 1300° F./8 h/AC Specimens: Tensile - 0.250" gage diameter threaded, low-stress ground Stress Rupture - 0.178" diameter combination smooth and notched (Kt = 3.9), low-stress ground

TABLE V

Microstructural Observations for Series II Heats

| | | | Solution | Microstructural Observations | |
|---|---|---|---|---|---|
| Heat | Si | Cb | Temp | Grain Structure | Precipitation |
| 1227 | <0.01 | 5.40 | 1800° F. | Mixed ASTM 10-11 with 6-7 | Extensive fine delta in fine grains |
| | | | 1800° F. | Mostly fine ASTM 10-11 | Extensive fine delta in fine grains |
| | | | 1850° F. | Uniform recrystallized 6-7 | Little or no precipitation |
| | | | 1850° F. | Uniform recrystallized 5-7 | Little or no precipitation |
| 1228 | 0.15 | 5.42 | 1800° F. | Mixed ASTM 9-10, some 6-7 | Moderate matrix delta only in fines |
| | | | 1800° F. | Mostly fine ASTM 9-10 | Moderate matrix delta |
| | | | 1850° F. | Recrystallized ASTM 5-7 | Little or no precipitation |
| | | | 1850° F. | Recrystallized ASTM 4-7 | Little or no precipitation |
| 1229 | 0.29 | 5.40 | 1800° F. | Mostly ASTM 10-11, some 6-8 | Extensive, more globular ppt. |
| | | | 1800° F. | Necklace structure of 6-7 and 11 | Mixed, small to large amount of ppt. |
| | | | 1850° F. | Recrystallized, mixed ASTM 5-8 | Mixed, small to moderate amount of ppt. |

TABLE V-continued

Microstructural Observations for Series II Heats

| | | | Solution | Microstructural Observations | |
|---|---|---|---|---|---|
| Heat | Si | Cb | Temp | Grain Structure | Precipitation |
| | | | 1850° F. | Recrystallized ASTM 5-7 | Small amount of grain boundary ppt. |
| 1230 | 0.29 | 6.01 | 1800° F. | Necklace structure ASTM 6-7 with 12 | Moderate to very extensive ppt. |
| | | | 1800° F. | Necklace structure ASTM 6-7 with 12 | Moderate to very extensive ppt. |
| | | | 1850° F. | Mixed ASTM 6-7 and 10-11 | Extensive globular ppt. |
| | | | 1850° F. | Mostly ASTM 10-11, some 6-7 | Extensive globular ppt. |
| 1231 | 0.42 | 5.43 | 1800° F. | Fine ASTM 10-12, some necklace | Extensive globular ppt. |
| | | | 1800° F. | Fine ASTM 11-12, some 6-8 | Extensive globular ppt. |
| | | | 1850° F. | Mostly fine ASTM 11-12 | Extensive globular ppt. |
| | | | 1850° F. | Mixed ASTM 11-12, some 6-8 | Extensive globular ppt. |

Heat Treatment: 1800° F. or 1850° F./1 h/AC + 1450° F./8 h/FC to 1300° F./8 h/AC

TABLE VI

| Chemical Compositions of Test Heats (Wt %) | | | | | | | | | | | | | | | | | |
|---|---|---|---|---|---|---|---|---|---|---|---|---|---|---|---|---|---|
| Heat | C | Mn | Si | P | S | Cr | Ni | Mo | W | Co | Al | Ti | Nb | B | Ca | Mg | Fe |
| 10931 | 0.025 | 0.05 | 0.05 | 0.007 | <0.0005 | 17.83 | 51.56 | 2.66 | 1.05 | 9.08 | 1.45 | 0.74 | 5.31 | 0.0051 | <0.001 | 0.003 | 10.19 |
| 10932 | 0.027 | 0.05 | 0.39 | 0.006 | <0.0005 | 17.97 | 51.87 | 2.70 | 1.00 | 9.07 | 1.46 | 0.74 | 5.34 | 0.0051 | <0.001 | 0.003 | 9.33 |

TABLE VII

| Mechanical Properties | | | | | | | | | | | | | | | | | |
|---|---|---|---|---|---|---|---|---|---|---|---|---|---|---|---|---|---|
| | | | | Room-Temperature Tensile | | | | 1300° F. Tensile | | | | Stress Rupture-1300° F./90 ksi | | | Stress Rupture-1300° F./100 ksi | | |
| Heat | % Si | Solution Temp (1 h/AC) | Sample Location | 0.2% YS (ksi) | UTS (ksi) | Elong (%-4D) | RA (%) | 0.2% YS (ksi) | UTS (ksi) | Elong (%-4D) | RA (%) | Time (hrs) | Elong (%-4D) | RA (%) | Time (hrs) | Elong (%-4D) | RA (%) |
| 10931 | 0.05 | 1800° F. | Mid-Radius | 141 | 202 | 25 | 47 | 121 | 151 | 7* | 15* | 164.7 | 27.5 | 38.5 | | | |
| | | | Mid-Radius | 143 | 205 | | 48 | 126 | 159 | ** | 16* | 145.6 | 32.7 | 49.9 | | | |
| | | | Center | | | | | | | | | | | | 0.1 | Notch Break | |
| | | 1815° F. | Mid-Radius | 141 | 203 | 24 | 46 | 119 | 159 | 12 | 14 | 19.5 | Notch Break | | 0.3 | Notch Break | |
| | | | Mid-Radius | | | | | | | | | 0.2 | Notch Break | | | | |
| | | | Center | 144 | 204 | 24* | 45* | | | | | | | | | | |
| | | 1830° F. | Mid-Radius | 134 | 202 | 32 | 46 | 116 | 157 | 10* | 12* | 0.0 | Notch Break | | 0.2 | Notch Break | |
| | | | Mid-Radius | | | | | | | | | 0.1 | Notch Break | | 0.2 | Notch Break | |
| | | | Center | 130 | 201 | 32 | 42 | | | | | | | | | | |
| | | 1850° F. | Mid-Radius | 130 | 198 | 33 | 47 | 110 | 147 | 11 | 17 | 0.2 | Notch Break | | | | |
| | | | Mid-Radius | 130 | 198 | 33 | 48 | 112 | 147 | 11 | 17 | 0.2 | Notch Break | | | | |
| | | *** | Mid-Radius | 135 | 202 | 31 | 46 | 116 | 157 | 11 | 13 | 0.2 | Notch Break | | | | |
| | | *** | Mid-Radius | 134 | 202 | 32 | 46 | | | | | 0.2 | Notch Break | | | | |
| | | *** | Mid-Radius | | | | | | | | | 150.8 | 29.7 | 31.2 | | | |
| | | Center | | | | | | | | | | 0.0 | Notch Break | | | | |
| 10932 | 0.39 | 1800° F. | Mid-Radius | 177 | 217 | 22 | 36 | 146 | 168 | 6 | 7 | 86.0 | 27.9 | 38.8 | | | |
| | | | Mid-Radius | 141 | 217 | 22 | 36 | 124 | 161 | 7 | 11 | 83.5 | ** | ** | | | |
| | | | Center | | | | | | | | | 33.3 | 25.9 | 27.1 | | | |
| | | 1815° F. | Mid-Radius | 151 | 211 | 26 | 36 | 128 | 165 | 10 | 11 | 91.2 | 18.1 | 17.8 | 26.9 | 19.9 | 18.4 |
| | | | Mid-Radius | | | | | | | | | 85.7 | 35.5 | 38.5 | 34.7 | 16.5** | 14.5** |
| | | | Center | 166 | 214 | 26 | 34 | | | | | | | | | | |
| | | 1830° F. | Mid-Radius | 149 | 210 | 23 | 39 | 123 | 160 | 10 | 10 | 81.2 | 29.6 | 29.1 | 27.0 | 15.4** | 16.1** |
| | | | Mid-Radius | | | | | | | | | 89.3 | 30.1 | 31.3 | 0.2 | Notch Break | |
| | | | Center | 157 | 212 | 22* | 36* | | | | | | | | | | |
| | | 1850° F. | Mid-Radius | 139 | 208 | 29 | 42 | 117 | 156 | 8 | 14 | 0.0 | Notch Break | | | | |
| | | | Mid-Radius | 141 | 208 | 29 | 41 | 120 | 158 | 7 | 12 | 0.0 | Notch Break | | | | |
| | | *** | Mid-Radius | 143 | 210 | 28 | 38 | 121 | 161 | 11 | 15 | 96.6 | 23.1 | 23.8 | | | |
| | | *** | Mid-Radius | 143 | 209 | 27 | 38 | | | | | 0.1 | Notch Break | | | | |
| | | *** | Mid-Radius | | | | | | | | | 0.1 | Notch Break | | | | |
| | | | Center | | | | | | | | | 0.0 | Notch Break | | | | |

* = broke in outer portion of gage section; ductility may not be representative
** = broke at gage mark; ductility values are not valid
*** = heat treated as full section rather than as small bank

TABLE VIII

Effects of Long-Term 1300° F. Exposure on Mechanical Properties

| | | | | Room-Temperature Tensile | | | | Charpy V-Notch | 1300° F. Tensile | | | | Stress Rupture at 1300° F./90 ksi | | |
|---|---|---|---|---|---|---|---|---|---|---|---|---|---|---|---|
| Heat | % Si | 1300° F. Exposure (hours) | Sample Location | 0.2% YS (ksi) | UTS (ksi) | Elong (%-4D) | RA (%) | Impact Energy (ft-lbs) | 0.2% YS (ksi) | UTS (ksi) | Elong (%-4D) | RA (%) | Time (hrs) | Elong (%-4D) | RA (%) |
| 10931 | 0.05 | 0 | Mid-Radius | 141 | 202 | 25 | 47 | | 121 | 151 | 7* | 15* | 164.7 | 27.5 | 38.5 |
| | | 0 | Mid-Radius | 143 | 205 | | 48 | | 126 | 159 | ** | 16* | 145.6 | 32.7 | 49.9 |
| | | 0 | Avg | 142 | 204 | 25 | 47 | | 124 | 155 | | | 155 | 30 | 44 |
| | | 1027 | Mid-Radius | 171 | 215 | 25 | 40 | 19 | 142 | 164 | 17 | 16 | 160.2 | 36.1 | 54.5 |
| | | 1027 | Mid-Radius | 168 | 213 | 26 | 42 | 23 | | | | | 162.1 | 27.2 | 52.0 |
| | | 1027 | Center | | | | | | | | | | 143.1 | 38.1 | 48.9 |
| | | 1027 | Surface | | | | | | | | | | 107.5 | 30.1 | 60.2 |
| | | 1027 | Surface | | | | | | | | | | 108.6 | 39.2 | 60.9 |
| | | 3000 | Mid-Radius | 162 | 212 | 22 | 35 | 12 | 142 | 163 | 23 | 24 | 140.1 | 37.9 | 60.9 |
| | | 3000 | Mid-Radius | 163 | 212 | 22 | 35 | 12 | 141 | 162 | 25 | 31 | 138.1 | 41.8 | 61.8 |
| | | 10000 | Mid-Radius | 145 | 206 | 18 | 21 | | 118 | 154 | 34 | 67 | 49.7 | 33.0 | 66.6 |
| | | 10000 | Mid-Radius | 143 | 206 | 16 | 17 | | 118 | 154 | 36 | 67 | 37.3 | 36.4 | 68.0 |
| | | 1027 | Avg | 169 | 214 | 26 | 41 | 21 | 142 | 164 | 17 | 16 | 161 | 32 | 52 |
| | | | Ratio | 119% | 105% | 103% | 86% | | 115% | 106% | — | — | 104% | 105% | 120% |
| | | 3000 | Avg | 163 | 212 | 22 | 35 | 12 | 142 | 163 | 24 | 28 | 139 | 40 | 61 |
| | | | Ratio | 115% | 104% | 89% | 74% | | 114% | 105% | — | — | 90% | 132% | 139% |
| | | 10000 | Avg | 144 | 206 | 17 | 19 | | 118 | 154 | 35 | 67 | 44 | 35 | 67 |
| | | | Ratio | 84% | 96% | 65% | 48% | | 83% | 94% | 207% | 419% | 27% | 96% | 123% |
| 10932 | 0.39 | 0 | Mid-Radius | 177 | 217 | 22 | 36 | | 146 | 168 | 6 | 7 | 86.0 | 27.9 | 38.8 |
| | | 0 | Mid-Radius | 177 | 217 | 22 | 36 | | 124 | 161 | 7 | 11 | 83.5 | ** | ** |
| | | 0 | Avg | 177 | 217 | 22 | 36 | | 135 | 165 | 6 | 9 | 85 | 28 | 39 |
| | | 1027 | Mid-Radius | 171 | 216 | 17 | 23 | 9 | 142 | 164 | 10 | 8 | 72.7 | 17.9 | 17.5 |
| | | 1027 | Mid-Radius | 172 | 216 | 19 | 25 | 9 | | | | | 70.2 | 18.8 | 16.8 |
| | | | Center | | | | | | | | | | 59.0 | 13.1 | 15.8 |
| | | | Surface | | | | | | | | | | 53.8 | 40.3 | 54.9 |
| | | | Surface | | | | | | | | | | 60.8 | 20.2 | 19.9 |
| | | 3000 | Mid-Radius | 165 | 214 | 17 | 22 | 6 | 140 | 162 | 17 | 23 | 66.7 | 24.0 | 21.0 |
| | | 3000 | Mid-Radius | 169 | 217 | 17 | 24 | 6 | 138 | 161 | 16 | 16 | 68.7 | 41.8 | 43.1 |
| | | 10000 | | 153 | 208 | 14 | 16 | | 114 | 151 | 34 | 58 | 27.0 | 37.9 | 68.0 |
| | | | | 152 | 207 | 13 | 13 | | 115 | 151 | 26 | 45 | 24.7 | 38.3 | 67.9 |
| | | 1027 | Avg | 171 | 216 | 18 | 24 | 9 | 142 | 164 | 10 | 8 | 71 | 18 | 17 |
| | | | Ratio | 97% | 100% | 81% | 67% | | 105% | 100% | 156% | 88% | 84% | 66% | 44% |
| | | 3000 | Avg | 167 | 216 | 17 | 23 | 6 | 139 | 161 | 17 | 20 | 68 | 33 | 32 |
| | | | Ratio | 95% | 99% | 78% | 65% | | 103% | 98% | 261% | 209% | 80% | 118% | 83% |
| | | 10000 | Avg | 153 | 208 | 13 | 14 | | 114 | 151 | 30 | 51 | 26 | 38 | 68 |
| | | | Ratio | 86% | 96% | 60% | 40% | | 84% | 92% | 472% | 546% | 31% | 137% | 175% |

* = broke in outer portion of gage section; ductility may not be representative
** = broke at gage mark; ductility values are not valid
Heat Treatment: 1800° F. + aged 1450° F./8 h/FC to 1300° F./8 h/AC
Specimens: Tensile - 0.250" gage diameter threaded, low-stress ground
Stress Rupture - 0.178" diameter combination smooth and notched (Kt = 3.9), low-stress ground

What is claimed is:

1. A method of making a precipitation hardenable nickel base alloy comprising the steps of:

providing charge materials in a vacuum melting furnace, said charge materials being selected to provide a precipitation hardenable nickel base alloy;

adding to said charge materials an amount of silicon effective to provide precipitation of a globular intermetallic phase in the alloy during elevated temperature processing thereof;

melting said charge materials and additions to form said alloy; and then casting the molten alloy to form an ingot.

2. A method as set forth in claim 1 wherein the step of providing the charge materials comprises the step of providing charge materials selected to provide a composition containing, in weight percent, about

| | |
|---|---|
| Carbon | 0.10 max. |
| Manganese | 0.35 max. |
| Phosphorus | 0.03 max. |
| Sulfur | 0.015 max. |
| Chromium | 12-20 |
| Molybdenum | 4 max. |
| Tungsten | 6 max. |
| Cobalt | 5-12 |
| Iron | 14 max. |
| Titanium | 0.4-1.4 |
| Aluminum | 0.6-2.6 |
| Niobium | 3-7 |
| Boron | 0.003-0.015 |

the balance being nickel and usual impurities.

3. A method as set forth in claim 2 wherein the step of adding silicon comprises adding sufficient silicon to provide a retained amount of about 0.2% to about 0.7% silicon in the ingot.

4. A method as set forth in claim 1 or claim 2 comprising the steps of:

forming said ingot into an article;

solution treating said article at a temperature of about 1750-1850° F.; and then age hardening said article.

5. A precipitation hardenable nickel base alloy that provides a unique combination of elevated temperature strength and ductility with reduced notch sensitivity at temperatures up to about 1300° F., said alloy comprising, in weight percent, about

| | |
|---|---|
| Carbon | 0.10 max. |
| Manganese | 0.35 max. |
| Silicon | 0.4-0.7 |
| Phosphorus | 0.03 max. |
| Sulfur | 0.015 max. |

-continued

| | |
|---|---|
| Chromium | 12-20 |
| Molybdenum | 4 max. |
| Tungsten | 6 max. |
| Cobalt | 5-12 |
| Iron | 14 max. |
| Titanium | 0.4-1.4 |
| Aluminum | 0.6-2.6 |
| Niobium | 3-7 |
| Boron | 0.003-0.015 |

the balance being nickel and usual impurities.

6. An alloy as set forth in claim 5 which contains at least about 4% niobium.

7. An alloy as set forth in claim 5 or claim 6 which contains not more than about 0.6% silicon.

8. An alloy as set forth in claim 7 which contains not more than about 6% niobium.

9. An alloy set forth in claim 8 wherein the sum of molybdenum and tungsten is at least about 2% and not more than about 8%.

10. An article formed of a precipitation hardenable nickel base alloy as claimed in claim 5 comprising a matrix formed of a nickel base alloy, a strengthening precipitate dispersed in said matrix, and a globular intermetallic precipitate dispersed at grain boundaries of said matrix material, such that the globular intermetallic precipitate restricts grain growth during elevated temperature processing of the alloy.

11. An article as set forth in claim 10 wherein the globular intermetallic precipitate contains one or more of Si, Fe, Ni, Co and Cr, or a combination thereof, in combination with one or more of Nb, Mo, W, and Ti, or a combination thereof.

12. An article as set forth in claim 10 which has been solution treated at a temperature of about 1750-1850° F. and age hardened.

13. An article as set forth in claim 10 which has been solution treated at a temperature of about 1800-1850° F. and age hardened.

* * * * *